Dec. 23, 1958 D. M. MacMILLIN 2,865,475
SPEED RESPONSIVE BRAKE
Filed Oct. 14, 1957 2 Sheets-Sheet 1
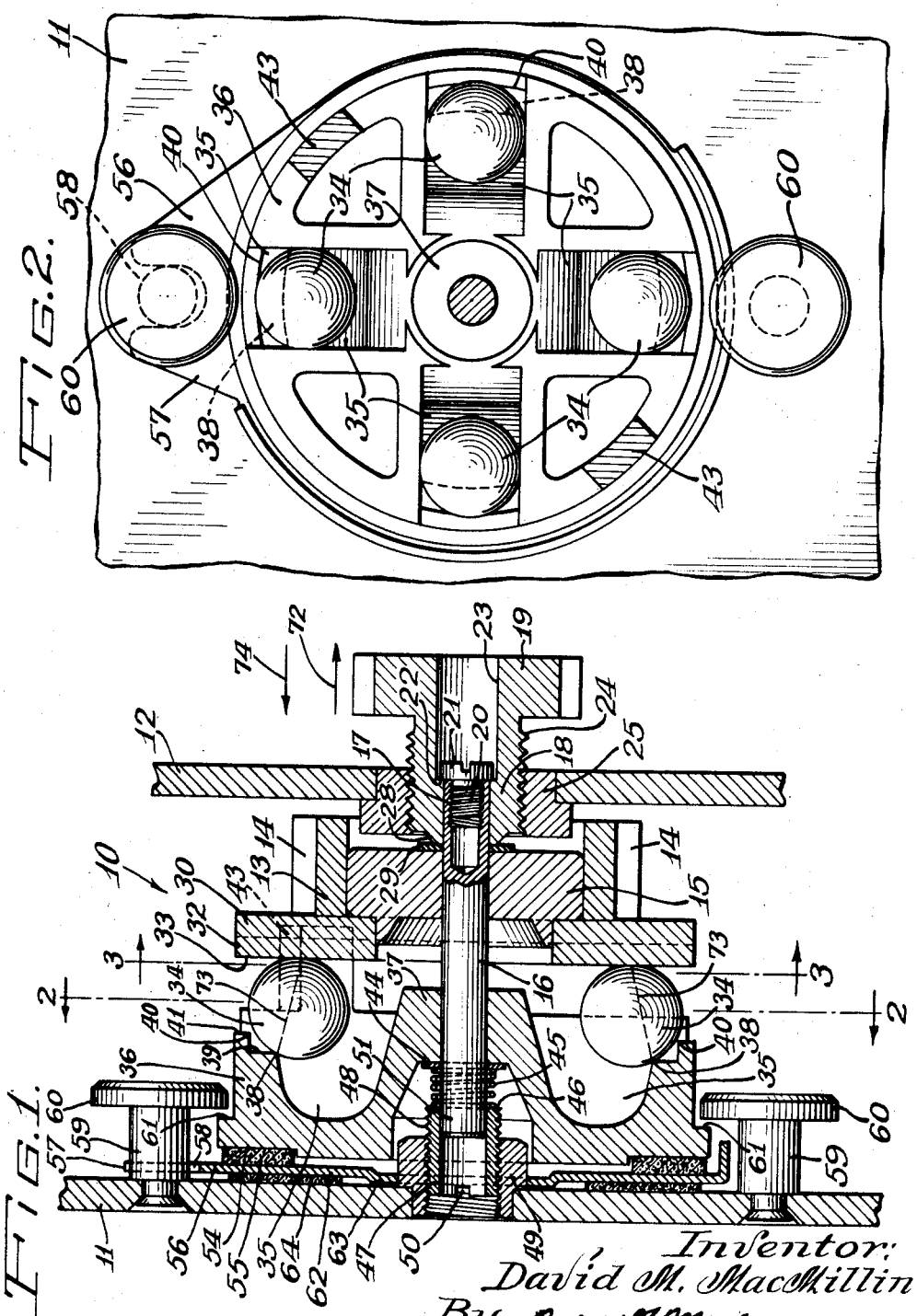
Inventor:
David M. MacMillin
By Robert F. Michler, Atty.

Dec. 23, 1958 D. M. MacMILLIN 2,865,475
SPEED RESPONSIVE BRAKE
Filed Oct. 14, 1957 2 Sheets-Sheet 2
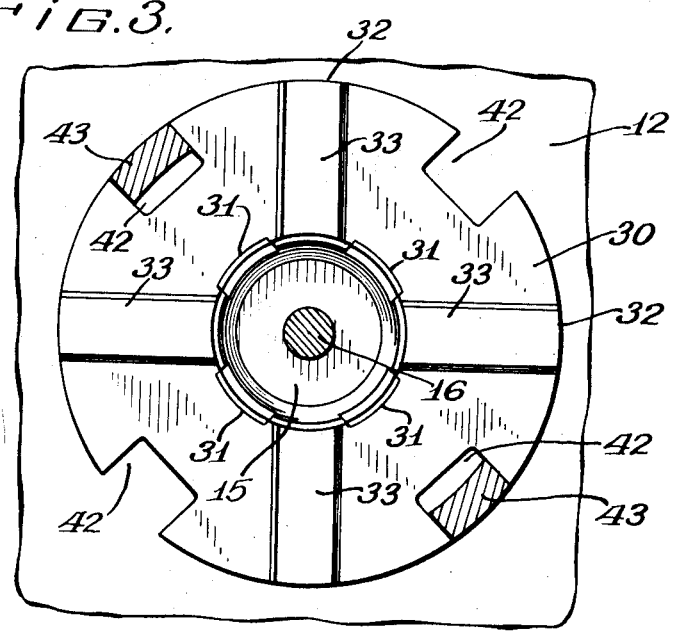
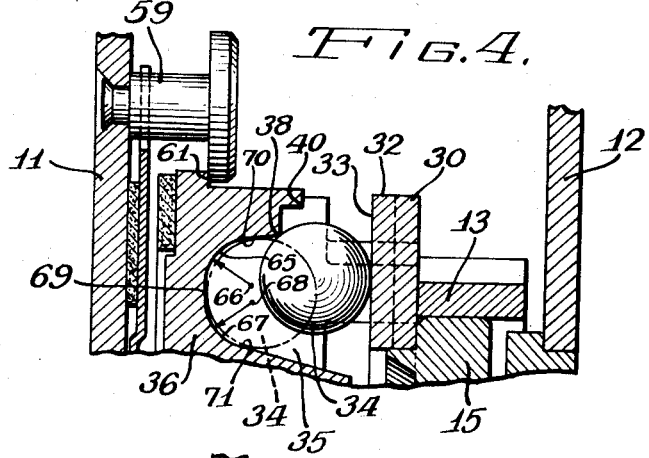
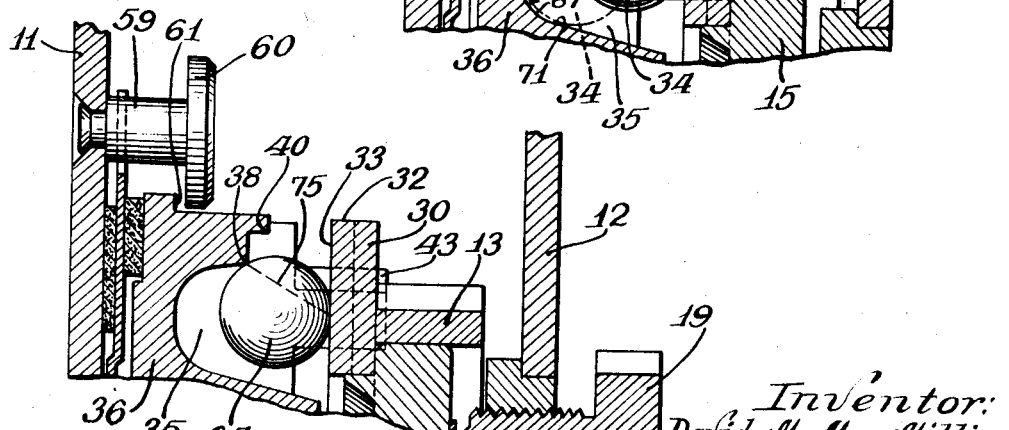
Inventor:
David M. MacMillin
By Robert F. Michler, Atty.

United States Patent Office 2,865,475
Patented Dec. 23, 1958

2,865,475

SPEED RESPONSIVE BRAKE

David M. MacMillin, Wilmette, Ill., assignor to Bell & Howell Company, Chicago, Ill., a corporation of Illinois Application October 14, 1957, Serial No. 689,909

6 Claims. (Cl. 188—187)

This invention relates, generally, to governors and it has particular relation to governors for motion picture cameras of the type illustrated in U. S. Patent No. 2,362,676, issued November 14, 1944.

Among the objects of this invention are: To provide for varying the speed of a driven member, such as the spring driven member of a motion picture camera for operating the shutter and moving the film past the aperture, over a wider range than heretofore has been possible; to employ a friction type centrifugal governor for this purpose; and to construct the governor in such manner that the friction drag increases as the mechanism is manually adjusted to decrease the speed of the driven member or decrease the number of frames per unit time that the film is moved past the aperture.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 1 is a vertical sectional view through the governor mechanism of a motion picture camera with the governor set to operate at a relatively low speed;

Figure 2 is a sectional view taken generally along the line 2—2 of Figure 1;

Figure 3 is a sectional view taken generally along the line 3—3 of Figure 1;

Figure 4 is a sectional view of the governor mechanism showing one of the balls and the relative positions of the associated parts when the mechanism is not in operation; and Figure 5 is a view, similar to Figure 4, and, in contrast with Figure 1, showing the relationship of the various parts when the governor is set to operate at a relatively high speed.

When a governor of the type illustrated in the patent above referred to is employed, the range of number of frames per second at which the camera can be adjusted to operate is relatively limited. In order to operate the camera in a different range, it is necessary to employ a modified governor construction. Essentially what was required was that two cameras be used, one having a governor arranged to be adjusted for a relatively low range and the other capable of being adjusted in a relatively higher range. The governor mechanism of the present invention is capable of adjustment over a relatively greater range of speed or to operate the mechanism over a wide range of frames per second.

Referring to the drawings and particularly to Figure 1, it will be observed that the reference character 10 designates, generally, a governor mechanism for a motion picture camera. The governor mechanism 10 is mounted between frame means comprising frame plates 11 and 12 which are positioned in parallel spaced relation and form part of the frame work for the camera. Adjacent the frame plate 12 is a gear wheel or driven member 13 having teeth 14 around its periphery that are arranged to be engaged by a drive pinion which is operated through suitable gearing from the drive spring of the camera. It is desirable that the speed of the gear wheel 13 be variable over a relatively wide range in order to permit the taking of pictures at various speeds in order to accommodate different conditions. In accordance with the present invention provision is made for varying a friction load applied to the gear wheel 13 in order to change the speed at which it operates and to maintain it in operation at the desired speed.

The gear wheel 13 has a pressed fit with a hub 15 which is staked to a shaft 16 and is rotatable therewith. One end 17 of the shaft 16 is journaled in a bearing portion 18 of a speed adjusting member 19 that is arranged to be manually operated. The speed adjusting member 19 can be twisted manually either by direct engagement therewith or it can be rotated through a gear train to effect the desired position thereof.

In order to cause translatory movement of the shaft 16 on rotation of the speed adjusting member 19 in one direction or the other a screw 20 is threaded into the end 17 of the shaft 16 and it has a head 21 which is arranged to bear against a shoulder 22 at the base of a counterbore 23 extending part way through the speed adjusting member 19. An external thread 24 is provided on the bearing portion 18 of the speed adjusting member 19 and it is threaded into a bushing 25 which is staked to the frame plate 12. At its inner end the bearing portion 18 is provided with a shoulder 28 against which a thrust washer 29 bears on one side with the other side bearing against the juxtaposed surface of the hub 15. This construction makes possible the translatory movement of the shaft 16 in either direction depending upon the direction of rotation of the speed adjusting member 19.

The speed at which the gear wheel 13 is permitted to rotate is controlled through the agency of a ball control plate 30 that is secured to the hub 15. As shown in Figure 3, the hub 15 is staked at 31 to the ball control plate 30. It will be understood that the ball control plate 30, gear wheel 13 and hub 15 rotate conjointly with the shaft 16.

The face of the ball control plate 30 on the side toward the frame plate 11 is provided with integral ribs 32 which have radially extending flat ball receiving surfaces 33 that are arranged to be engaged tangentially by governor balls 34, Figure 2, which are confined in radially extending slots 35 that are provided in a cage 36. The cage 36 has a central hub 37 which is journaled on the shaft 16 and is arranged to be moved endwise thereof for effecting the speed control function in a manner to be described hereinafter.

Near the outer ends of each of the slots 35 is an arcuate control edge 38 which is located along a ledge 39. As shown more clearly in Figures 1 and 5 of the drawings the governor balls 34 are arranged to rotate about the control edges 38 in tangential engagement with the flat ball receiving surfaces 33 when the balls are thrown outwardly by centrifugal force incident to rotation of the cage 36 conjointly with the driven member 13.

Outwardly beyond each of the control edges 38 there is a calibrating edge 40 which extends along a ledge 41 at the extreme outer end of each of the slots 35. The calibrating edges 40 are employed in making the initial factory adjustment of the governor mechanism 10 and thereafter serve no other function.

Provision is made for causing the cage 36 to rotate conjointly with the driven member 13. This is accomplished through the provision of radial slots 42, Figure 3, that are formed in the ball control plate 30 which is staked to the hub 15 to which the driven member or gear wheel 13 is secured. Extending into two of the four slots 42 are tongues 43 which are formed integrally with the cage 36. Through the inter-action between the tongues 43 and the slots 42, the cage 36 is permitted to move translatorily toward and away from the driven member 13 to vary the friction drag applied to the latter as controlled by the positions of the governor balls 34 in rotating about the control ledges 38.

Referring to Figure 1 it will be observed that a thrust washer 44 is provided at the outer end of the hub 37 of the cage 36. Bearing against the thrust washer 44 is a governor spring 45 which is a coil compression spring and, as shown, it surrounds the shaft 16. The other end of the spring 45 bears against the inner end 46 of a sleeve 47 which is externally threaded at 48 for threading into a bushing 49 which is staked to the frame plate 11. At its outer end the sleeve 47 is provided with a kerf 50 for receiving a screw driver to facilitate making the factory adjustment of the governor mechanism 10 in a manner to be described. It will be noted that the other end 51 of the shaft 16 is journaled in the sleeve 47.

Provision is made for applying a friction drag to the cage 36. For this purpose an annular face 54 is formed on the cage 36 and it has secured thereto an annular friction washer 55 which is arranged to bear against a non-rotatable friction plate 56 which is loosely mounted on the bushing 49. As shown in Figure 2 the friction plate 56 is provided with a bifurcated portion 57 having a slot 58 in which is located one of a pair of stop pins 59 that are riveted to the frame plate 11, as shown in Figure 1. The stop pins 59 carry heads 60 which overlie an annular shoulder 61 on the cage 36 and, as shown in Figure 4, limit the movement thereof toward the frame plate 12 under the influence of the spring 45 when the governor 10 is not operating or is in the relaxed position.

In order to avoid metallic contact between the friction plate 56, which is formed of metal, and the frame plate that also is formed of metal, the intermediate portion 62 of the friction plate 56 is spaced inwardly from the frame plate 11 by offsetting it from its central portion 63 that directly surrounds the bushing 49. Interposed between the intermediate portion 62 of the friction plate 56 and the juxtaposed surface of the frame plate 11 is a non-metallic gasket 64.

Figure 4 shows alternate relaxed positions of one of the governor balls 34. In order to facilitate movement of the governor ball 34 from the position shown by the broken line to the position shown by the full line, special attention is paid to the shape of the bottom of the slot 35. It will be noted that it is formed by a surface 65 whose center is located at 66 and by another intercepting surface 67 whose center is located at 68. The juncture between the surfaces 65 and 67 is in the form of an edge 60 which has limited area contact with the governor ball 34 when it occupies the position shown by the broken line. In addition to engaging the edge 69 the governor ball 34 engages the sides of the slot 35 at 70 and 71. Because of this limited area engagement, the governor balls 34 readily fly out of the respective slots 35 when they are subjected to the centrifugal force incident to the rotation of the cage 36 and driven member 13.

The factory adjustment is made by running the governor mechanism 10 at the slowest speed at which it is intended to operate. The speed adjusting member 19 is positioned in accordance with this lowest speed and then the tension of the spring 45 is adjusted by inserting a screw driver into the kerf 50 and rotating the sleeve 47 in one direction or the other such as to bring the governor balls 34 into predetermined proximity with the respective calibrating edges 40. This then determines the minimum speed at which the governor mechanism 10 will permit the gear wheel or driven member 13 to rotate.

When the governor mechanism 10 is set to operate at an intermediate or a high speed and it is desired to set it to function at a lower speed, the speed adjusting member 19 is adjusted manually to move in the direction indicated by the arrow 72. This is accompanied by a movement of the gear wheel or driven member 13 and parts affixed thereto to the right or away from the frame plate 11. The positions of the governor balls 34 for slow speed operation are indicated in Figure 1. Broken lines 73 interconnect the portions of the governor balls that are engaged by the control edges 38 on one side and by the flat ball receiving surfaces 33 on the other. The thrust exerted by the governor balls 34 against the cage 36 increases the compressive force applied to the friction washer 55 and thereby to the friction plate 56 with the result that the speed of the cage 36 is correspondingly reduced.

When the speed of the governor mechanism 10 is to be increased, the speed adjusting member 19 is rotated in the opposite direction in order to effect movement thereof in the direction indicated by the arrow 74 with a corresponding movement of the driven member 13 and parts connected thereto being effected. This moves the ball control plate 30 nearer to the frame plate 11 and brings the governor balls 34 closer to the axis of rotation of the cage 36 as shown in Figure 5. Here the broken line 75 interconnects the portion of the governor ball 34 which engages the arcuate control edge 38 with the portion of the opposite side of the governor ball 34 that is in tangential engagement with the flat ball receiving surface 33.

Now it will be observed that the broken lines 73 for the relatively slower speed of the governor mechanism 10 are more nearly parallel to the axis of rotation of the cage than is the broken line 75, Figure 5, for the relatively higher speed. At the lower speed the thrust applied from the ball control plate 30 to the cage 36 through the governor balls 34 is more directly in line and thus a greater thrust can be applied against the friction plate 56 to reduce the speed of the driven member 13 than is the case when the line of action is more inclined as illustrated in Figure 5 for the higher speed. This makes it possible to adjust the governor mechanism 10 over a substantially greater speed range than heretofore had been possible.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A governor comprising, in combination, frame means, a shaft carried by said frame means, a rotatable driven member, the speed of which is to be controlled, carried by said shaft and having radially extending flat ball receiving surfaces, a rotatable cage carried by said shaft and having radial slots facing said ball receiving surfaces of said driven member, said cage being movable toward and away from said driven member, means interconnecting said driven member and said cage whereby the latter rotates conjointly with the former, a ball in each slot, the portions of said slots contacted by said balls when they are thrown outwardly by centrifugal force incident to rotation of said driven member into tangential engagement with the respective ball receiving surfaces on said driven member being characterized by requiring that the lines through the respective balls joining the portions where they are tangent to said slots and said surfaces be more nearly parallel to the axis of rotation of said cage at relatively slow speed thereof than they are at relatively high speed, a spring reacting between said cage and said frame means to bias said cage toward said driven member, a friction plate non-rotatably carried by said frame means in spaced relation to said cage, friction means interposed between said friction plate and said cage, and a manually adjustable member carried by said frame means and cooperating with said driven member to move the same toward or away from said cage to effect respectively an increase or a decrease in the speed thereof.

2. A governor comprising, in combination, frame means, a shaft carried by said frame means, a rotatable driven member, the speed of which is to be controlled, carried by said shaft and having radially extending flat ball receiving surfaces, a rotatable cage carried by said shaft and having radial slots facing said ball receiving surfaces of said driven member, said cage being movable toward and away from said driven member, means interconnecting said driven member and said cage whereby the latter rotates conjointly with the former, a ball in each slot, a ledge at the outer end of each slot having an arcuate control edge about which the respective ball rotates when it is thrown outwardly by centrifugal force incident to rotation of said driven member into tangential engagement with the respective ball receiving surface on said driven member, spring means reacting between said cage and said frame means to bias said cage toward said driven member, a friction plate non-rotatably carried by said frame means in spaced relation to said cage, friction means interposed between said friction plate and said cage, and a manually adjustable member carried by said frame means and cooperating with said driven member to move the same toward or away from said cage to effect respectively an increase or a decrease in the speed thereof.

3. A governor comprising, in combination, frame means, a shaft carried by said frame means, a rotatable driven member, the speed of which is to be controlled, carried by said shaft and having radially extending flat ball receiving surfaces, a rotatable cage carried by said shaft and having radial slots facing said ball receiving surfaces of said driven member, said cage being movable toward and away from said driven member, means interconnecting said driven member and said cage whereby the latter rotates conjointly with the former, a ball in each slot, a ledge at the outer end of each slot having an arcuate control edge about which the respective ball rotates when it is thrown outwardly by centrifugal force incident to rotation of said driven member into tangential engagement with the respective ball receiving surface on said driven member, spring means reacting between said cage and said frame means to bias said cage toward said driven member, means adjustably carried by said frame means for varying the tension of said spring, a friction plate non-rotatably carried by said frame means in spaced relation to said cage, friction means interposed between said friction plate and said cage, stop means carried by said frame means and cooperating with said cage to limit the movement thereof away from said friction plate under the biasing action of said spring, and a manually adjustable member carried by said frame means and cooperating with said driven member to move the same toward or away from said cage to effect respectively an increase or a decrease in the speed thereof.

4. A governor comprising, in combination, a pair of frame plates in parallel spaced relation, a shaft extending between and rotatably mounted at its ends on said frame plates, a rotatable driven member, the speed of which is to be controlled, carried by said shaft and having radially extending flat ball receiving surfaces, a rotatable cage carried by said shaft and having radial slots facing said ball receiving surfaces of said driven member, said cage being movable toward and away from said driven member, means interconnecting said driven member and said cage whereby the latter rotates conjointly with the former, a ball in each slot, a ledge at the outer end of each slot having an arcuate control edge about which the respective ball rotates when it is thrown outwardly by centrifugal force incident to rotation of said driven member into tangential engagement with the respective ball receiving surface on said driving member, spring means reacting between said cage and one of said frame plates to bias said cage toward said driven member, a stationary friction plate disposed between said one frame plate and said cage, an annular friction washer interposed between said friction plate and said cage, stop means cooperating with said cage to limit the movement thereof away from said friction plate under the biasing action of said spring, and a manually adjustable member carried by the other frame plate and cooperating with said driven member to move the same toward or away from said cage to effect respectively an increase or a decrease in the speed thereof.

5. A governor comprising, in combination, a pair of frame plates in parallel spaced relation, a shaft extending between and rotatably mounted at its ends on said frame plates, a rotatable driven member, the speed of which is to be controlled, carried by said shaft and having radially extending flat ball receiving surfaces, a rotatable cage carried by said shaft and having radial slots facing said ball receiving surfaces of said driven member, said cage being movable toward and away from said driven member, tongue and slot means on said driven member and said cage whereby the latter rotates conjointly with the former, a ball in each slot, a ledge at the outer end of each slot having an arcuate control edge about which the respective ball rotates when it is thrown outwardly by centrifugal force incident to rotation of said driven member into tangential engagement with the respective ball receiving surface on said driven member, a coil compression spring surrounding said shaft and reacting between said cage and one of said frame plates to bias said cage toward said driven member, a sleeve adjustably carried by said one frame plate and providing a bearing for one end of said shaft and a surface at one end against which said spring reacts for varying the tension thereof to adjust the position of said balls, a friction plate non-rotatably carried by said one frame plate between it and said cage, an annular friction washer interposed between said friction plate and said cage, stop means carried by said one frame plate and cooperating with said cage to limit the movement thereof away from said friction plate under the biasing action of said spring, and a manually adjustable member carried by the other frame plate and providing a bearing for the other end of said shaft and cooperating with said driven member to move the same toward or away from said cage to effect respectively an increase or a decrease in the speed thereof.

6. A governor comprising, in combination, a pair of frame plates in parallel spaced relation, a shaft extending between and rotatably mounted at its ends on said frame plates, a rotatable driven member, the speed of which is to be controlled, carried by said shaft and having radially extending flat ball receiving surfaces, a rotatable cage carried by said shaft and having radial slots facing said ball receiving surfaces of said driven member, said cage being movable toward and away from said driven member, tongue and slot means on said driven member and said cage whereby the latter rotates conjointly with the former, a ball in each slot, an inner ledge at the outer end of each slot having an arcuate control edge about which the respective ball rotates when it is thrown outwardly by centrifugal force incident to rotation of said driven member into tangential engagement with the respective ball receiving surface on said driven member and an outer ledge beyond said inner ledge having an arcuate calibrating edge, a coil compression spring surrounding said shaft and reacting between said cage and one of said frame plates to bias said cage toward said driven member, a sleeve adjustably carried by said one frame plate and providing a bearing for one end of said shaft and a surface at one end against which said spring reacts for varying the tension thereof to adjust the position of said balls relative to said calibrating edges, a friction plate non-rotatably carried by said one frame plate between it and said cage, an annular friction washer interposed between said friction plate and said cage, stop means carried by said one frame plate and cooperating with said cage to limit the movement thereof away from said friction plate under the biasing action of said spring, and a manually adjustable member carried by the other frame plate and providing a bearing for the other end of said shaft and cooperating with said driven member to move the same toward or away from said cage to effect respectively an increase or a decrease in the speed thereof.

No references cited.